(12) United States Patent
Freedman et al.

(10) Patent No.: US 9,690,092 B2
(45) Date of Patent: Jun. 27, 2017

(54) MEMS SCANNING MIRROR LIGHT PATTERN GENERATION

(71) Applicant: Intel Corporation, Santa Clara, CA (US)

(72) Inventors: Barak Freedman, Binyamina (IL); Sagi Ben Moshe, Kiryat Byalik (IL); Ron Kimmel, Haifa (IL)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 14/128,915

(22) PCT Filed: Jun. 28, 2013

(86) PCT No.: PCT/US2013/048611
§ 371 (c)(1),
(2) Date: Dec. 23, 2013

(87) PCT Pub. No.: WO2014/209371
PCT Pub. Date: Dec. 31, 2014

(65) Prior Publication Data
US 2015/0198800 A1    Jul. 16, 2015

(51) Int. Cl.
*H04N 7/18* (2006.01)
*G02B 26/08* (2006.01)
(Continued)

(52) U.S. Cl.
CPC ........ *G02B 26/0833* (2013.01); *G01B 11/254* (2013.01); *G02B 26/105* (2013.01); *G06K 9/00604* (2013.01); *H04N 13/0203* (2013.01)

(58) Field of Classification Search
CPC .................................................. G02B 26/0833
(Continued)

(56) References Cited

U.S. PATENT DOCUMENTS 6,664,537 B2   12/2003 Engelhardt et al.
7,259,777 B2    8/2007 Retschke et al.
(Continued)

FOREIGN PATENT DOCUMENTS

CN      1308837 A    8/2001
CN    101995657 A    3/2011
(Continued)

OTHER PUBLICATIONS

Milanovic et al., ""MEMSEYE" for Optical 3D Tracking and Imaging Applications" [2011], IEEE, Solid-State Sensors, Actuators and Microsystems Conference (Transducers), 2011 16th International, p. 1895.*

(Continued)

*Primary Examiner* — Gims Philippe
*Assistant Examiner* — Amir Shahnami
(74) *Attorney, Agent, or Firm* — Schwabe, Williamson & Wyatt, P.C.

(57) ABSTRACT

Techniques and configurations for an apparatus for projecting a light pattern on an object are described. In one embodiment, the apparatus may include a laser arrangement configured to generate a laser line, a tiltable micro-electro-mechanical system (MEMS) mirror configured to tiltably reflect the laser line, and a controller configured to control tilting of the MEMS mirror to enable the reflected laser line to project a light pattern on the object. The controller may be configured to control the MEMS mirror with a tilting frequency that is complementary to an optical power of the laser line, or to control the optical power of the laser line to be complementary to the tilting frequency of the MEMS mirror.

21 Claims, 3 Drawing Sheets

(51) Int. Cl.
*G01B 11/25* (2006.01)
*G02B 26/10* (2006.01)
*G06K 9/00* (2006.01)
*H04N 13/02* (2006.01)

(58) Field of Classification Search
USPC ........................................................ 348/136
See application file for complete search history.

(56) References Cited

U.S. PATENT DOCUMENTS

| | | | |
|---|---|---|---|
| 7,573,022 B2 | 8/2009 | Choo et al. | |
| 7,756,323 B2 | 7/2010 | Kimmel | |
| 2005/0174579 A1 | 8/2005 | Notni et al. | |
| 2008/0278566 A1 | 11/2008 | Towner et al. | |
| 2009/0262363 A1* | 10/2009 | Keshavmurthy | G01B 11/2509 356/511 |
| 2010/0067007 A1* | 3/2010 | Videen | G01N 15/0205 356/342 |
| 2010/0067554 A1* | 3/2010 | Wysocki | B82Y 20/00 372/20 |
| 2011/0025860 A1 | 2/2011 | Katougi et al. | |
| 2011/0134499 A1 | 6/2011 | Konno et al. | |
| 2012/0001961 A1 | 1/2012 | Nishikawa et al. | |
| 2012/0200829 A1* | 8/2012 | Bronstein | G02B 27/2271 353/7 |
| 2013/0001834 A1 | 1/2013 | El-Siblani et al. | |
| 2013/0083384 A1* | 4/2013 | Yamagata | G01B 11/24 359/227 |
| 2013/0141734 A1 | 6/2013 | Aoki | |
| 2014/0002337 A1 | 1/2014 | Bandringa et al. | |
| 2015/0161818 A1 | 6/2015 | Komenczi et al. | |

FOREIGN PATENT DOCUMENTS

| | | | |
|---|---|---|---|
| CN | 201974159 U | | 9/2011 |
| CN | 103033143 A | | 4/2013 |
| CN | 103066487 A | * | 4/2013 |
| JP | 2003061936 A | | 3/2003 |
| JP | 2003329955 A | | 11/2003 |
| JP | 2007-010354 A | | 1/2007 |
| JP | 2012202803 A | | 10/2012 |
| KR | 1020100051139 A | | 5/2010 |
| TW | 479444 B | | 3/2002 |
| WO | 2009124118 A1 | | 10/2009 |
| WO | 2013054814 A1 | | 4/2013 |

OTHER PUBLICATIONS

International Search Report and Written Opinion mailed Mar. 21, 2014 for International Application No. PCT/US2013/048611, 12 pages.
Milanovic et al., "Memseye" for Optical 3D Tracking and Imaging Applications, Transducers 2011 Conference, Jun. 5-9, 2011, Beijing, China, 4 pages.
TW Office Action for TW Application No. 103119562, dated Jun. 25, 2015, 13 pages.
Notice of Reason(s) for Rejection mailed Dec. 15, 2015, issued in corresponding Japanese Patent Application No. 2015-524290, 6 pages.
First Office Action mailed Feb. 19, 2016, issued in corresponding Chinese Patent Application No. 201380033389.3, 8 pages.
International Preliminary Report on Patentability mailed Jan. 7, 2016, issued in corresponding International Application No. PCT/US2013/048611, 9 pages.
International Preliminary Report on Patentability mailed Jun. 23, 2016, issued in related International Application No. PCT/US2014/066460.
Notice of Preliminary Rejection mailed May 17, 2016, issued in corresponding Korean Patent Application No. 2014-7036593, 20 pages.
Non-Final Office Action mailed Mar. 28, 2016, issued in corresponding U.S. Appl. No. 14/104,242, filed Dec. 12, 2013.
Non-Final Office Action mailed Oct. 24, 2016, issued in corresponding U.S. Appl. No. 15/251,578, 12 pages.
Second Office Action mailed Oct. 10, 2016, issued in corresponding Chinese Patent Application No. 201380033389.3.
Notice of Final Rejection mailed Nov. 24, 2016, issued in corresponding Korean Patent Application No. 2014-7036593.
Supplementary European Search Report mailed Dec. 23, 2016, issued in corresponding European Patent Application No. 13888254.3, 10 pages.
Notice of Dismissal of Amendment issued Jan. 23, 2017, in corresponding Korean Patent Appln. No. 2014-7036593, 10 pages.
Communication pursuant to Article 94(3) EPC, mailed Apr. 5, 2017, issued in corresponding European Patent Application No. 13888254.3, 5 pages.

* cited by examiner

MEMS SCANNING MIRROR LIGHT PATTERN GENERATION

CROSS REFERENCE TO RELATED APPLICATION

The present application is a national phase entry under 35 U.S.C. §371 of International Application No. PCT/US2013/048611, filed Jun. 28, 2013, entitled "MEMS SCANNING MIRROR LIGHT PATTERN GENERATION," which designates, among the various States, the United States of America, and the entire contents and disclosures of which are hereby incorporated by reference in their entireties.

FIELD

Embodiments of the present disclosure generally relate to the field of opto-electronics, and more particularly, to using micro-electronic system (MEMS) scanning mirror to generate a light pattern.

BACKGROUND

One of the fundamental design considerations in the construction of optoelectronic three-dimensional (3D) scanning systems, such as laser scanners, projectors, and other laser devices is an allowed optical power of the projector. On one hand, the optical power should be sufficient to provide a required signal-to-noise ratio for the acquired optical data. On the other hand, the optical power may be limited by a mechanical form factor of the system, electrical power consumption, and the like. Eye safety considerations may be a substantial optical power limiting factor because of strict limitations to the strength and duration of the projected optical power on a human pupil.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include techniques and configurations for using MEMS scanning mirror to generate a light pattern.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first feature formed, deposited, or otherwise disposed on a second feature," may mean that the first feature is formed, deposited, or disposed over the second feature, and at least a part of the first feature may be in direct contact (e.g., direct physical and/or electrical contact) or indirect contact (e.g., having one or more other features between the first feature and the second feature) with at least a part of the second feature.

Figure 1:
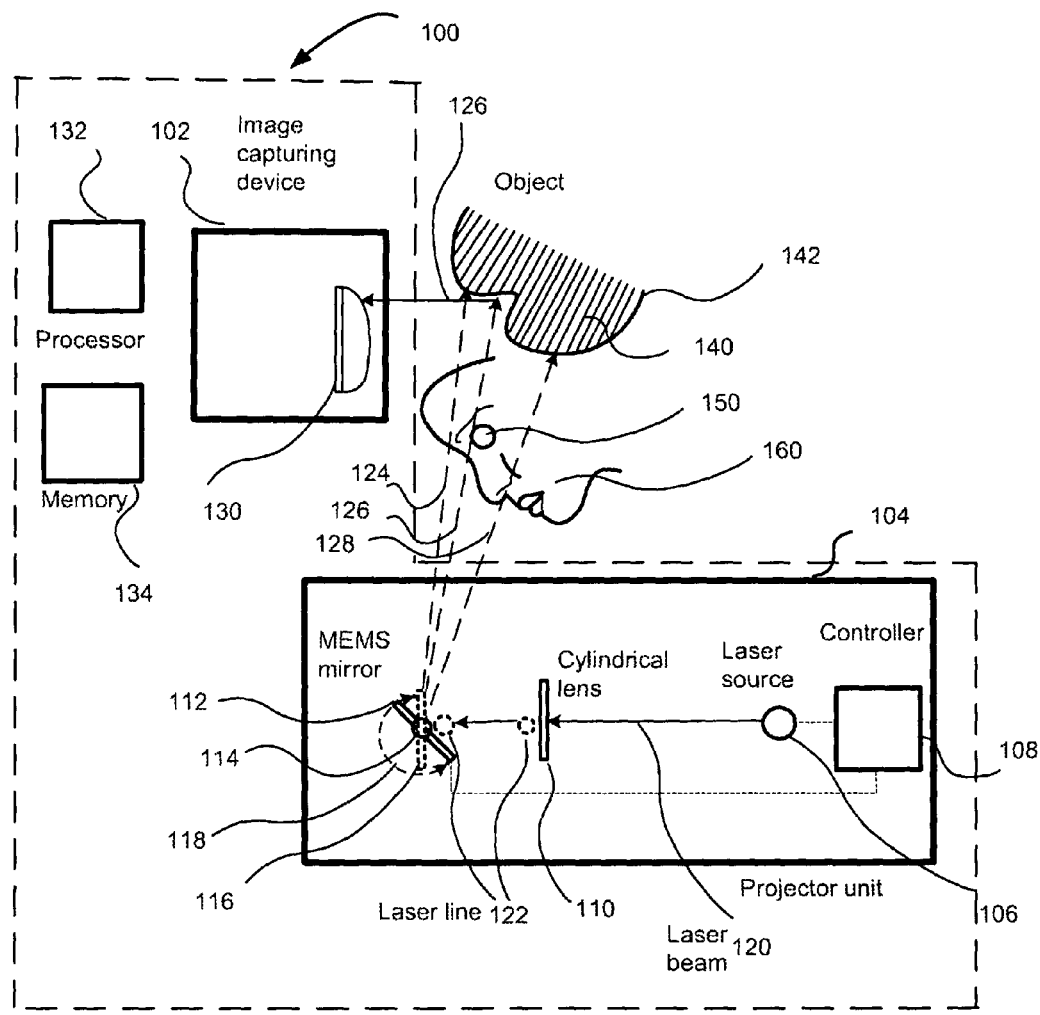
FIG. 1 schematically illustrates an example device for a three-dimensional (3D) object acquisition, in accordance with some embodiments.

FIG. 1 schematically illustrates an example device 100 for a three-dimensional (3D) object acquisition in accordance with some embodiments of the present disclosure. In some embodiments, the device 100 may include a 3D scanner, a 3D camera or any other device configured for a 3D object acquisition. In some embodiments, as illustrated, the device 100 may include an image capturing device 102 (e.g., a digital camera) and a projector unit 104, such as a laser projector or laser scanner, having a number of components. The device 100 components may further include laser arrangement that includes a laser source 106, such as a laser device configured to provide a laser beam 120, coupled with a controller 108. The controller 108 may be configured to control (e.g., modulate) an optical power of the laser beam 120 provided by the laser source 106, as will be described below in greater detail. The laser arrangement may further include an optical lens 110. The laser source 106 and the optical lens 110 may be configured so that modulated laser beam 120 may pass through the optical lens 110. The lens 110 may be a lens configured to focus light which passes through on to a line instead of on to a point, in contrast to a spherical lens, for example. In some embodiments, the lens 110 may be a cylindrical lens. Accordingly, the lens 110 may be configured to transform the laser beam 120 passing through the lens 110 into a laser line 122. For better understanding of a spatial disposition of the laser line 122 note that the laser line 122 may be disposed on a plane that is perpendicular to the plane of FIG. 1. Accordingly, the laser line 122 formed from the laser beam 120 passing through the lens 110 is shown as perpendicular to the plane of FIG. 1.

The laser line 122 may be received and deflected by a tiltable or rotatable mirror 112 of device 100, forming, during mirror tilting, multiple laser planes, such as ones indicated by numerals 124, 126, and 128. In some embodiments, the mirror 112 may be a micro-electromechanical system (MEMS) scanning mirror. In some embodiments, a mirror surface of MEMS scanning mirror 112 may be made of silicon (Si), although in different materials providing required properties related to scanning mirror reflection qualities may be utilized in various embodiments. In some embodiments, the mirror 112 may be a single-axis mirror, while in other embodiments the mirror 112 may be a two-axis MEMS scanning mirror or a two-mirror system.

In some embodiments, the MEMS scanning mirror 112 may be configured to be tiltable (rotatable), at least partially tiltable, around the axis 114, in order to deflect the laser line 122 so as to correspond to a desired dimension of a light pattern 140 projected by the mirror 112 to an object 142 and defined by the laser planes 124, 126, 128. For example, the mirror 112 may be tiltable, as shown by 118, at least from its resting position indicated by the numeral 116 to a position indicated by the MEMS scanning mirror 112, in order to provide a scan angle that ensures a desired dimension for the light patterns defined by the exit laser planes 124, 126, 128. In some embodiments, the controller 108 may be configured to control tilting of the mirror 112. The formation of the light pattern 140 will be described in reference to FIG. 2.

Figure 2:
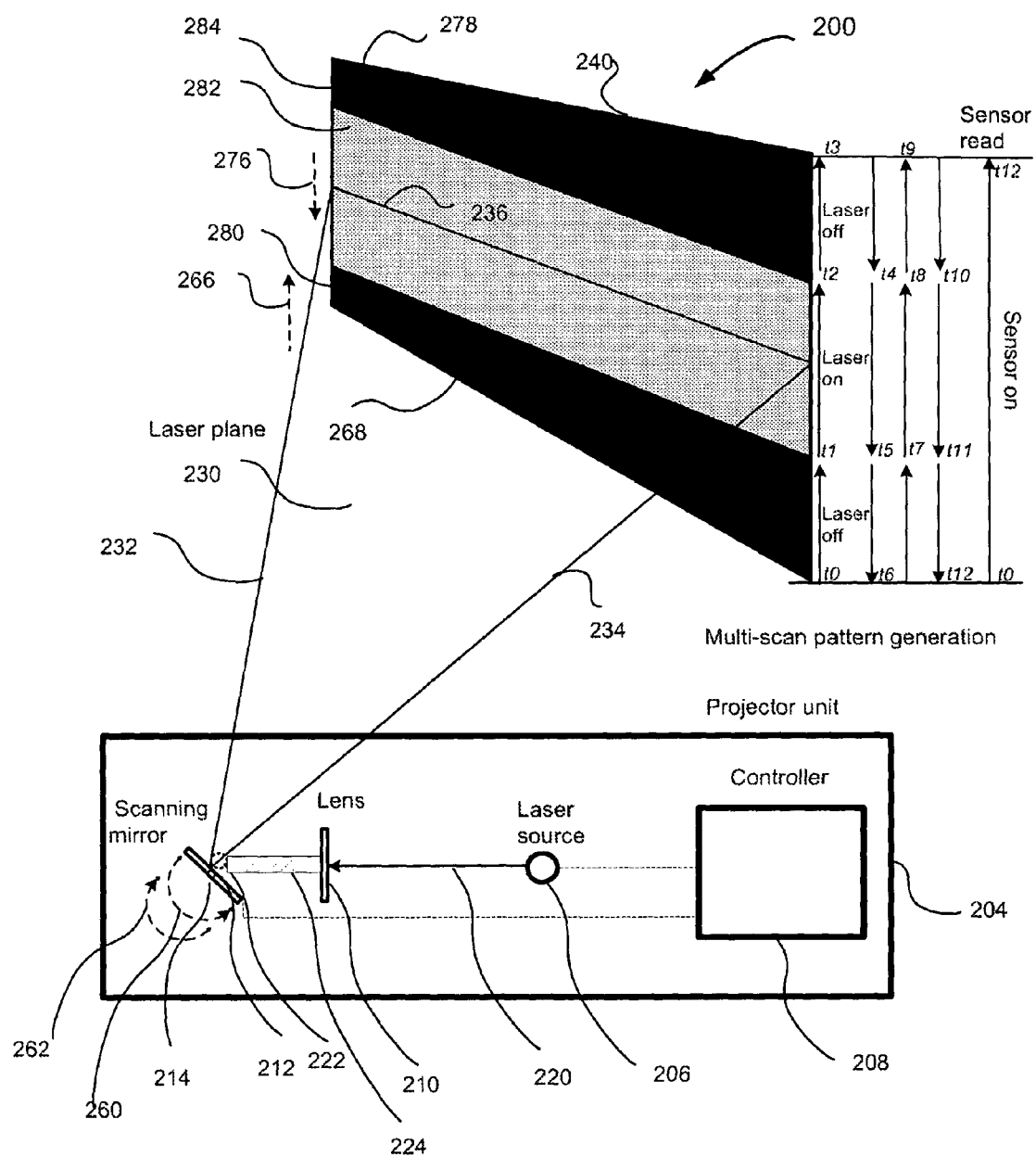
FIG. 2 schematically illustrates an example operation of a projector unit configured to generate multiple scans of a light pattern for provisioning a 3D object acquisition, in accordance with some embodiments.

Note that the axis 114 is substantially parallel to the laser line 122, and the mirror 112 is disposed within a plane that is perpendicular to the plane of FIG. 2 and may be tiltable around the axis 114, as shown. Accordingly, the laser planes 124, 126, 128 may also be substantially perpendicular to the plane of FIG. 2 and are indicated by the dashed lines for simplicity purposes.

The light patterns 140 formed by the laser planes 124, 126, 128 on a surface of the object 142 may be received 126 by the image capturing device 102 and sensed (e.g., read) by a sensor 130 of the image capturing device 102. Based on the readings of the multiple scans of the light patterns accumulated during a sensing cycle of the sensor 130, the image capturing device 102 may be able to reconstruct the shape of the object 142.

To enable the sensing, storing, and processing the light patterns, the device 100 may further include a number of components. The components may include a processor 132, coupled with a memory 134 configured to enable the above-noted and other functionalities of the device 100. For example, the processor 132 may be configured with executable instructions stored in the memory 134 to enable operations of a laser source 106, controller 108, and the MEMS scanning mirror 112 as described herein.

As shown in FIG. 1, a pupil 150 of a person 160, such as a user of the device 100 may be exposed, during the operation of the device 100, to at least a portion of the laser planes 124, 126, 128 deflected by the MEMS scanning mirror 112. The embodiments of the device 100 according to various techniques and configurations that provide light patterns having an optical power within a power range that may be safe for exposure to a human eye will be described further herein.

In some embodiments, the device 100 described herein may further include additional components. For example, the processor 132, the memory 134, and/or other components may comport with a processor-based system that may be a part of, or include, the device 100, in accordance with some embodiments. The memory 134 for one embodiment may include any suitable volatile memory, such as suitable Dynamic Random Access Memory (DRAM), for example.

In some embodiments, the memory 134 may include instructions that, when executed on the processor 132, may configure the controller 108 to control the optical power of the laser beam 120 produced by the laser source 106. Additionally or alternatively, in some embodiments, the memory 134 may include instructions that, when executed on the processor 132, may configure the controller 108 to control tilting of the MEMS scanning mirror 112 as will be described below. In some embodiments, the controller 108 may be implemented as a software component stored, e.g., in the memory 134 and configured to execute on the processor 132. In some embodiments, the controller 108 may be implemented as a combination of a software and hardware components. In some embodiments, the controller 108 may include a hardware implementation. The functions of the controller 108 will be described in greater detail in reference to FIG. 2.

The processor 132, memory 134, other components (not shown), image capturing device 102, and projector unit 104 may be coupled with one or more interfaces (not shown) configured to facilitate information exchange among the above-mentioned components. Communications interface(s) (not shown) may provide an interface for the device 100 to communicate over one or more wired or wireless network(s) and/or with any other suitable device. In various embodiments, the device 100 may be included to or associated with, but is not limited to, a server, a workstation, a desktop computing device, or a mobile computing device (e.g., a laptop computing device, a handheld computing device, a handset, a tablet, a smartphone, a netbook, ultrabook, etc.).

In various embodiments, the device 100 may have more or less components, and/or different architectures. For example, in some embodiments, the device 100 may include one or more of a camera, a keyboard, display such as a liquid crystal display (LCD) screen (including touch screen displays), a touch screen controller, non-volatile memory port, antenna or multiple antennas, graphics chip, ASIC, speaker(s), a battery, an audio codec, a video codec, a power amplifier, a global positioning system (GPS) device, a compass, an accelerometer, a gyroscope, and the like. In various embodiments, the device 100 may have more or less components, and/or different architectures. In various embodiments, techniques and configurations described herein may be used in a variety of systems that benefit from the principles described herein such as optoelectronic, electro-optical, MEMS devices and systems, and the like.

FIG. 2 is an example diagram 200 illustrating operation of a projector unit 204 configured to generate multiple scans of a light pattern for provisioning a 3D object acquisition, in accordance with some embodiments. The projector unit 204 may be implemented similarly to the projector unit 102 described in reference to FIG. 1.

As described above, the projector unit 204 may include a laser source 206, a controller 208, a lens 210 configured to focus a laser beam 220 which passes through the lens on to a laser line 222, and a MEMS scanning mirror 212. Laser source 206 and lens 210 may form a laser arrangement. In some embodiments, the controller 208 may be configured to control (e.g., modulate) the optical power of the laser beam 220 and/or control the tilting frequency of the MEMS scanning mirror 212.

The modulated laser beam 220 may pass through the lens (e.g., optical lens) 210 forming the laser line 222 that is disposed perpendicular to the plane of FIG. 2. The MEMS scanning mirror 212 may be configured to be at least partially tiltable around the axis 214 disposed parallel to the laser line 222 and to deflect the laser line 222 during tilting. More specifically, the MEMS scanning mirror 212, while tilting, may scan the laser line 222 and deflect a resulting laser plane 230 defined as schematically illustrated by borders 232, 234, and front line 236. As a result of the mirror tilting reflection of the laser line 222, the laser plane 230 may form one or more scans of a light pattern 240. Note that the laser plane 230 formed by the deflected laser line 222 is parallel to the plane 224 of the laser line 222, i.e., perpendicular to the plane of FIG. 2. The laser plane 230 and the light pattern 240 formed by the laser plane 230 as a result of the mirror tilting reflection are shown in a three-dimensional view for purposes of illustration. As shown, the light pattern 240 formed by the front line 236 of the laser plane 230 moving as a result of the tilting reflection of the laser line 222 may take a substantially rectangular shape. Note, however, that the light pattern 240 shape is schematically illustrated in FIG. 2 as a parallelogram for pure illustration purposes.

The light pattern 240 may be formed as follows. Assume the MEMS scanning mirror 212 is tiltably reflecting the laser line 222 by tilting (rotating) counterclockwise 260 around the axis 214 from its resting position (not shown). Accordingly, the light pattern 240 may be formed by the front line 236 moving upward 266 from its start position (lower end 268 of the light pattern 240) that corresponds to the resting position of the mirror 212. Similarly, if the mirror is tiltably reflecting the laser line 222 by tilting (rotating) clockwise 262 around the axis 214 from its end position (not shown), the light pattern 244 may be formed by the front line 236 moving downward 276 from its start position (upper end 278 of the light pattern 240) that corresponds to the end position of the mirror 212. As shown, the moving front line 236 may form one or more substantially two-dimensional patterns, such as rectangles, comprising the light pattern 240.

In operation, the controller 208 may be configured to modulate the laser beam 220 such that the laser source 206 may be turned on and off, e.g., periodically. Accordingly, the resulting light pattern 240 may comprise multiple dark and light rectangles, forming, in some embodiments, a bar-code-like shape. For example, as shown in FIG. 2, the light pattern 240 formed by the front line 236 moving upward 266 may include a dark rectangle 280 during the time period t0-t1 when the laser source 206 is turned off, a light rectangle 282 during the time period t1-t2 when the laser source 206 is turned on, and another dark rectangle 284 during the time period t2-t3 when the laser source 206 is turned off.

The controller 208 may be configured to modulate the optical power of the laser source 206 (and accordingly the optical power of the laser line 222) to ensure that the optical power of the laser plane 230 resulting from the MEMS scanning mirror 212 scanning the laser line 222 remains within eye-safe optical power limits. For this purpose, the optical power of the laser beam 220 may be synchronized, e.g., matched with the tilting frequency of the MEMS scanning mirror 212. The MEMS scanning mirror 212 may be configured to rotate with a tilting frequency within a particular frequency range that may ensure that the optical power of the scanned laser line 222 projected to an object remains within a particular power range (e.g., eye safe power range). For example, the MEMS scanning mirror 212 may be configured to tilt with a frequency range that may enable the MEMS scanning mirror 212 to conduct multiple scans of the laser line 222 during a sensing cycle of a capturing device configured to capture an object (e.g., during a reading cycle of a sensor 130 of the image capturing device 102). In other words, the MEMS scanning mirror 212 may be configured to tilt such as to project to the object multiple (e.g., at least two or more) light patterns 240 formed by the multiple scans of the laser line 222. For example, as shown in FIG. 2, the sensor 130 reading cycle may include a period of time from t0 to t12. During this time period, the MEMS scanning mirror 212, while tilting, at least partially, clockwise and counterclockwise, may scan the laser line 222 multiple times, taking multiple scans of the laser line 222 during the reading cycle (e.g., exposure) of the sensor 130.

For purposes of illustration, FIG. 2 shows an example where the MEMS scanning mirror 212 may scan the laser line 222 four times, generating four light patterns during the sensor 130 reading cycle. The first light pattern may be formed (generated) during a first scan of the laser line 222, forming a light pattern with the front line 236 moving upward 266. The formed light pattern 240 may include a dark rectangle 280 (time period t0-t1, laser source 206 off), a light rectangle 282 (time period t1-t2, laser source 206 on), and another dark rectangle 284 (time period t2-t3, laser source 206 off).

The second light pattern may be formed during a second scan of the laser line 222, forming a light pattern with the front line 236 moving downward 276. The formed light pattern 240 may include a dark rectangle 284 (time period t3-t4, laser source 206 off), a light rectangle 282 (time period t4-t5, laser source 206 on), and another dark rectangle 280 (time period t5-t6, laser source 206 off).

The third light pattern may be formed during a third scan of the laser line 222, forming a light pattern with the front line 236 moving upward 266. The formed light pattern 240 may include a dark rectangle 280 (time period t6-t7, laser source 206 off), a light rectangle 282 (time period t7-t8, laser source 206 on), and another dark rectangle 284 (time period t8-t9, laser source 206 off).

The fourth light pattern may be formed during a fourth scan of the laser line 222, forming a light pattern with the front line 236 moving downward 276. The formed light pattern 240 may include a dark rectangle 284 (time period t9-t10, laser source 206 off), a light rectangle 282 (time period t10-t11, laser source 206 on), and another dark rectangle 280 (time period t11-t12, laser source 206 off). It will be appreciated that the number of multiple patterns formed during one reading cycle of the sensor 130 may not be limited to four patterns illustrated in FIG. 2. The number of light patterns formed during one reading cycle may vary and may depend on a tilting frequency of the MEMS scanning mirror 212 and/or optical power of the laser beam 220.

The tilting frequency of the MEMS scanning mirror 212 may be controlled, e.g., by the controller 208, according to one or more criteria. In some embodiments, the tilting frequency of the MEMS scanning mirror 212 may be controlled to correspond to (e.g., be complementary to) the optical power or the laser beam 220 such that the optical power of the resulting laser plane 230 may remain within a certain power range, e.g., within the power range that is eye-safe. The optical power of the laser beam 120 may be selected to provide sufficiently detectable readings for the sensor 130 (e.g., provide a desired signal-to-noise ratio (SNR) for the light pattern read by the sensor 130), yet may remain within particular, (in some embodiments, eye-safe) power range due to the rapid scanning by the MEMS scanning mirror 212.

In some embodiments, in the alternative or in addition to being complementary to the optical power of the laser beam 220, the tilting frequency of the mirror MEMS scanning 212 may be controlled such as to form multiple light patterns during a sensor reading cycle. Forming multiple light patterns during one sensor reading cycle may ensure sufficient accumulation of electro-protons for each read pixel and provide a desired SNR for the light patterns read by the sensor 130.

In some embodiments, in the alternative or in addition to being complementary to the optical power of the laser beam 220, the tilting frequency of the MEMS scanning mirror 212 may be controlled to avoid undesired effects, such as noise that may emulate from the tilting mirror at some tilting frequencies. For example, the tilting frequency may be controlled to comply with noise requirements associated with the MEMS scanning mirror 212 tilting. In some embodiments, the selected tilting frequency range of the MEMS scanning mirror 212 may vary from about 4 kHz to about 6 kHz. In some embodiments, the frequency range may vary from 20 kHz and above.

In some embodiments, the optical power of the laser beam 220 (and consequently an optical power of the laser line 222 and laser plane 230) may be controlled (e.g., modulated) by the controller 208 such as to correspond to (e.g., be complementary to) the tilting frequency of the MEMS scanning mirror 212 controlled e.g., to ensure that the optical power of the laser plane 230 is kept within a particular power range (e.g., eye-safe power range), to avoid undesired acoustic noise effects, and/or to provide multiple light patterns during one sensing cycle. Accordingly, in some embodiments, the optical power of the laser plane 230 may remain within a certain power range (e.g., eye-safe power range), while the MEMS scanning mirror 212 may not generate undesired acoustic noise, and multiple light patterns provided by the tilting frequency of the MEMS scanning mirror 212 may provide for sufficiently detectable readings for the sensor 130 (e.g., provide a desired SNR for the light patterns read by the sensor 130).

For example, the controller 208 may be configured to match an optical power of the laser beam 220 provided by the laser source 206 to the tilting frequency of the MEMS scanning mirror 212. In some embodiments, the optical power of the laser beam 220 may be modulated corresponding to a change of the tilting frequency of the MEMS scanning mirror 212. For example, the optical power of the laser beam 220 may increase corresponding to the increasing tilting frequency of the MEMS scanning mirror 212, and may decrease corresponding to the decreasing tilting frequency of the MEMS scanning mirror 212, keeping the projected optical power of the scanned laser line at a substantially constant level during a scanning span of the MEMS scanning mirror 212.

For example, during one scan, the MEMS scanning mirror 212 may tilt from its resting position with the tilting frequency that may increase from substantially zero to its maximum about half-way through a mirror span and then decrease to about substantially zero when the mirror reaches its end position in the mirror span. The optical power of the laser beam 220 may correspondingly increase during the first half of the mirror span and then decrease during the second half of the mirror span, providing substantially constant optical power value for the projected laser plane 230. The optical power value of the projected laser plane 230 may remain within particular optical power range. In some embodiments, the optical power range of the projected laser plane 230 may remain within the power range according to a Class 1 Laser Safety Standard 60825-1 as provided by the International Electrotechnical Commission (IEC). Accordingly, in some embodiments, the controller 208 may be configured to turn the optical power of the laser source 206 on and off to generate light patterns described above and to change the optical power of the laser source 206 corresponding to the change of the tilting frequency of the MEMS scanning mirror 212 during the mirror tilting.

In some embodiments, the controller 208 may be configured to modulate the laser beam 220 provided by the laser source 206 using a correction table. The correction table may include a set of tilting frequency values for a scanning span of the mirror, and each tilting frequency value may be associated with a corresponding optical power value of the laser beam 220. Each combination of a tilting frequency value and a corresponding optical value may enable keeping the projected optical power of the scanned laser line 222, i.e., the laser plane 230, within a desired, e.g., eye-safe power range.

Figure 3:
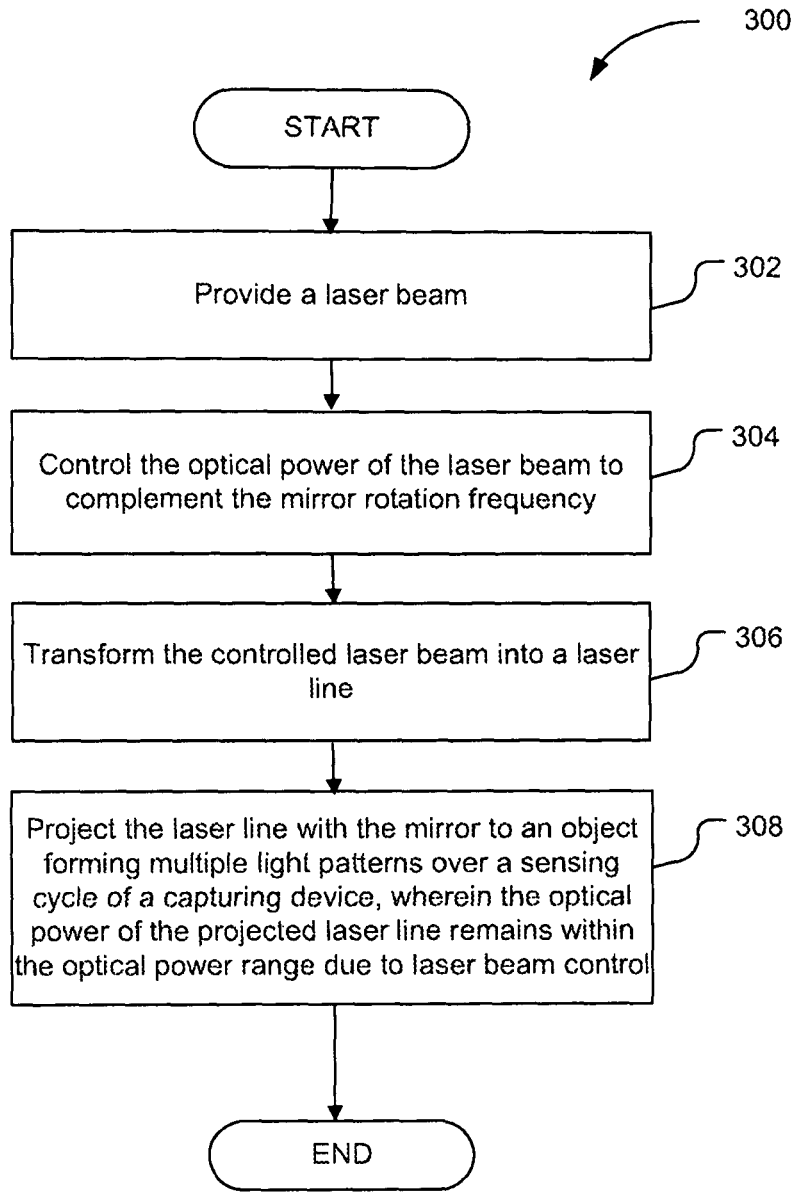
FIG. 3 is a process flow diagram illustrating operation of the projector unit as described in reference to FIGS. 1 and 2, in accordance with some embodiments.

FIG. 3 is a process flow diagram illustrating operation of the projector unit 104 (204) as described in reference to FIGS. 1 and 2, in accordance with some embodiments. The process 300 may begin at block 302, where a laser beam 120 (220) may be provided, e.g., by a laser source 106 (206) of a projector unit 104 (204).

At block 304, the optical power of the laser beam 120 (220) may be controlled (e.g., modulated) to complement the tilting frequency of the MEMS scanning mirror 112 (212). The tilting frequency of the mirror may remain within a determined frequency range as described in reference to FIG. 2. In some embodiments, the tilting frequency may be controlled to be complementary to the optical power of the laser beam 120 (220).

At block 306, the modulated laser beam 120 (220) may be transformed to form a laser line 122 (222). As described above, the laser beam 120 (220) may be transformed using cylindrical lens 110 (210), in some embodiments.

At block 308, the laser line 222 may be scanned and projected with the MEMS scanning mirror 112 (212) to an object forming multiple light patterns 240 over a sensing cycle of a capturing device (e.g., sensor 130 of the image capturing device 102). In some embodiments, the optical power of the projected laser line 222 may remain within particular power range due to laser beam 120 (220) control and/or MEMS scanning mirror 112 (212) tilting frequency control as described in reference to FIG. 2.

The embodiments described herein may be further illustrated by the following examples.

Example 1 is an apparatus for projecting a light pattern on an object, comprising a laser arrangement configured to generate a laser line; a tiltable micro-electromechanical system (MEMS) mirror configured to tiltably reflect the laser line; and a controller coupled to the laser arrangement and the MEMS mirror, and configured to control tilting of the MEMS mirror to enable the reflected laser line to project a light pattern on the object, wherein the controller is configured to control the MEMS mirror with a tilting frequency that is complementary to an optical power of the laser line, or to control the laser arrangement to regulate the optical power of the laser line to complement the tilting frequency of the MEMS mirror.

Example 2 may include the subject matter of Example 1, and further specifies the laser arrangement is controlled to regulate the optical power of the laser line based at least in part on a requirement of an image capturing device configured to capture an image of the object, based at least in part on the light pattern projected on the object.

Example 3 may include the subject matter of Example 2, and further specifies the image capturing device is a digital camera, and wherein the requirement is associated with a sensing cycle of the digital camera.

Example 4 may include the subject matter of Example 1, and further specifies the controller is configured to control the tilting frequency of the MEMS mirror to project multiple scans of the light pattern for each sensing cycle of an image capturing device configured to capture an image of the object, each scan providing one light pattern projected on the object.

Example 5 may include the subject matter of Example 4, and further specifies the controller is configured to control the laser arrangement to regulate the optical power of the laser line to maintain an optical power of the light pattern within an optical power range.

Example 6 may include the subject matter of Example 5, and further specifies the controller is configured to further control the tilting frequency of the MEMS mirror to comply with acoustic noise requirements associated with the MEMS mirror tilting.

Example 7 may include the subject matter of Example 1, and further specifies the laser arrangement comprises a laser source configured to provide a laser beam and a cylindrical lens configured to transform the laser beam into the laser line.

Example 8 may include the subject matter of Example 1, and further specifies the MEMS scanning mirror comprises a single-axis mirror tiltable about an axis that is substantially parallel to the laser line.

Example 9 may include the subject matter of Example 1, and further specifies the tilting frequency ranges from about 4 kHz to about 6 kHz or above 20 kHz.

Example 10 may include the subject matter of Examples 1 to 9, and further specifies each scan of the light pattern comprises a substantially two-dimensional pattern.

Example 11 may include the subject matter of Example 10, and further specifies the substantially two-dimensional pattern comprises a rectangle.

Example 12 may include the subject matter of Example 1, and further specifies the controller is configured to control the laser arrangement to change the optical power of the laser line in response to a change in tilting frequency of the MEMS scanning mirror, wherein the optical power of the laser beam is increased in response to an increase in tilting frequency of the MEMS scanning mirror, and decreases corresponding to decreasing scanning speed, keeping the projected optical power of the scanned laser line at a substantially constant level during a scanning span of the MEMS scanning mirror.

Example 13 is an apparatus for projecting a light pattern on an object to acquire an image of the object, comprising: a projector unit, including a laser arrangement configured to generate a laser line, a tiltable micro-electromechanical system (MEMS) mirror configured to tiltably reflect the laser line, and a controller coupled to the laser arrangement and the MEMS mirror, and configured to control tilting of the MEMS mirror with a tilting frequency to enable the reflected laser line to project a light pattern on an object, wherein the controller is configured to control the laser arrangement to regulate an optical power of the laser line to complement the tilting frequency of the MEMS mirror; and an image capturing device configured to acquire an image of the object based on readings of one or more scans of the light patterns projected onto the object accumulated during a sensing cycle of the image capturing device.

Example 14 may include the subject matter of Example 13, and further specifies the controller is configured to further control the tilting frequency of the MEMS mirror to project multiple scans of the light pattern on the object for each sensing cycle of the image capturing device, with each scan projects one light pattern on the object.

Example 15 may include the subject matter of Example 13, and further specifies the controller is configured to control the laser arrangement to regulate the optical power of the laser line to maintain an optical power of the light pattern within an optical power range.

Example 16 may include the subject matter of Example 15, and further specifies the controller is configured to control the laser arrangement to regulate the optical power using a correction table, the correction table including a set of tilting frequency values of the MEMS mirror, with each tilting frequency value associated with an optical power value of the laser line that is with an optical power range.

Example 17 may include the subject matter of Example 13, and further specifies the controller is configured to further control the tilting frequency of the MEMS mirror to comply with acoustic noise requirements associated with the MEMS mirror tilting.

Example 18 may include the subject matter of Example 13, and further specifies the controller is configured to further control the MEMS mirror with the tilting frequency that is complementary to the optical power of the laser line.

Example 19 may include the subject matter of Example 13, and further specifies the MEMS scanning mirror comprises a single-axis mirror tiltable about an axis that is substantially parallel to the laser line.

Example 20 may include the subject matter of Example 13, and further specifies the MEMS scanning mirror comprises a two-axis mirror or a two-mirror device.

Example 21 may include the subject matter of Example 13, and further specifies the tilting frequency is within a frequency range from about 4 kHz to about 6 kHz or above 20 kHz.

Example 22 may include the subject matter of Examples 13 to 21, and further specifies the image capturing device includes a sensor configured to sense the light pattern projected onto the object.

Example 23 is a method for projecting a light pattern on an object, comprising: controlling an optical power of a laser line to complement tilting frequency of a tiltable micro-electromechanical system (MEMS) mirror configured to tiltably reflect the laser line; and scanning the laser line with the MEMS mirror with the tilting frequency that provides multiple scans of the light pattern onto the object during a sensing cycle of an image capturing device.

Example 24 may include the subject matter of Example 23, and further specifies that the method includes providing a laser beam; and transforming the laser beam into the laser line.

Example 25 is an apparatus for projecting a light pattern on an object, comprising:
a laser arrangement configured to generate a laser line; and a controller coupled to the laser arrangement and configured to control the laser arrangement to regulate an optical power of the laser line to complement a tilting frequency of a tiltable micro-electromechanical system (MEMS) mirror configured to tiltably reflect the laser line to project a light pattern on the object.

Example 26 may include the subject matter of Example 25, and further specifies the laser arrangement is controlled to regulate the optical power of the laser line based at least in part on a requirement of an image capturing device configured to capture an image of the object, based at least in part on the light pattern projected on the object.

Example 27 is an apparatus for projecting a light pattern on an object, comprising: a tiltable micro-electromechanical system (MEMS) mirror configured to tiltably reflect the laser line; and a controller coupled to the MEMS mirror and configured to control tilting of the MEMS mirror to enable the reflected laser line to project a light pattern on the object, wherein the controller is configured to control the MEMS mirror with a tilting frequency that is complementary to an optical power of the laser line.

Example 28 may include the subject matter of Example 27, and further specifies the optical power of the laser line is selected based at least in part on a requirement of an image capturing device configured to capture an image of the object, based at least in part on the light pattern projected on the object.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus for projecting a light pattern on an object, comprising:
   a laser arrangement to generate a laser line;
   a tiltable micro-electromechanical system (MEMS) mirror to tiltably reflect the laser line; and
   a controller communicatively coupled to the laser arrangement and the MEMS mirror, to control tilting of the MEMS mirror to enable the reflected laser line to project a light pattern on the object,
   wherein the controller is to control the laser arrangement to regulate an optical power of the laser line to complement a tilting frequency of the MEMS mirror, wherein to regulate the optical power includes to increase the optical power of the laser line in response to increase of the tilting frequency of the MEMS mirror, and to decrease the optical power of the laser line in response to decrease of the tilting frequency of the MEMS mirror, according to correction values that include tilting frequency values of the MEMS mirror and corresponding optical power values of the laser line, wherein the optical power of the laser line is to increase during a first half of a mirror span and to decrease during a second half of the mirror span, wherein the controller is to apply combinations of tilting frequency values and corresponding optical power values to the laser arrangement and the MEMS mirror to maintain the optical power of the projected light pattern within a desired power range, wherein the tilting frequency values are selected within a frequency range for the MEMS mirror to project multiple scans of the laser line on the object during a sensing cycle of a capturing device, to capture an image of the object in response to the projection of the light pattern on the object by the apparatus, and wherein the corresponding optical power values are further selected to provide a desired signal-to-noise ratio (SNR) for the light pattern during the sensing cycle that comprises a receipt of readings of multiple scans of the light pattern on the object.

2. The apparatus of claim 1, wherein the image capturing device is a digital camera, and wherein a requirement is associated with the sensing cycle of the digital camera.

3. The apparatus of claim 1, wherein the controller is to control the laser arrangement to regulate the optical power of the laser line to maintain an optical power of the light pattern within an optical power range.

4. The apparatus of claim 3, wherein the controller is to control the tilting frequency of the MEMS mirror to comply with acoustic noise requirements associated with the MEMS mirror tilting.

5. The apparatus of claim 1, wherein the laser arrangement comprises:
   a laser source to provide a laser beam; and
   a cylindrical lens to transform the laser beam into the laser line.

6. The apparatus of claim 1, wherein the MEMS mirror comprises a single-axis mirror tiltable about an axis that is parallel to the laser line.

7. The apparatus of claim 1, wherein the tilting frequency ranges from 4 kHz to 6 kHz or above 20 kHz.

8. The apparatus of claim 1, wherein each scan of the light pattern comprises a substantially two-dimensional pattern.

9. The apparatus of claim 8, wherein the substantially two-dimensional pattern comprises a rectangle.

10. An apparatus for projecting a light pattern on an object to acquire an image of the object, comprising:
    a projector unit, including:
      a laser arrangement to generate a laser line to project the light pattern on the object;
      a tiltable micro-electromechanical system (MEMS) mirror to tiltably reflect the laser line; and
      a controller communicatively coupled to the laser arrangement and the MEMS mirror, to control the laser arrangement to regulate an optical power of the laser line to complement a tilting frequency of the MEMS mirror, wherein to regulate the optical power includes to increase the optical power of the laser line in response to increase of the tilting frequency of the MEMS mirror, and to decrease the optical power of the laser line in response to decrease of the tilting frequency of the MEMS mirror, according to correction values that include tilting frequency values of the MEMS mirror and corresponding optical power values of the laser line, wherein the optical power of the laser line is to increase during a first half of a mirror span and to decrease during a second half of the mirror span, wherein the controller is to apply combinations of tilting frequency values and corresponding optical power values to the laser arrangement and the MEMS mirror to maintain the optical power of the projected light pattern within a desired power range; and
    an image capturing device to acquire an image of the object based on readings of multiple scans of the light patterns projected onto the object accumulated during a sensing cycle of the image capturing device that comprises a receipt of the readings of the multiple scans of the light patterns, wherein the tilting frequency values are selected within a frequency range for the MEMS mirror to project the multiple scans of the laser line on the object during the sensing cycle of the capturing device, and wherein the corresponding optical power values are further selected to provide a desired signal-to-noise ratio (SNR) for the light pattern during the sensing cycle.

11. The apparatus of claim 10, wherein each scan projects one light pattern on the object.

12. The apparatus of claim 10, wherein the controller is to control the tilting frequency of the MEMS mirror to comply with acoustic noise requirements associated with the MEMS mirror tilting.

13. The apparatus of claim 10, wherein the controller is to further control the MEMS mirror with the tilting frequency that is complementary to the optical power of the laser line.

14. The apparatus of claim 10, wherein the MEMS mirror comprises a single-axis mirror tiltable about an axis that is substantially parallel to the laser line.

15. The apparatus of claim 10, wherein the MEMS mirror comprises a two-axis mirror or a two-mirror device.

16. The apparatus of claim 10, wherein the tilting frequency is within a frequency range from 4 kHz to 6 kHz or above 20 kHz.

17. The apparatus of claim 10, wherein the image capturing device includes a sensor to sense the light pattern projected onto the object.

18. An apparatus for projecting a light pattern on an object, comprising:
a laser arrangement to generate a laser line to project the light pattern on the object; and
a controller communicatively coupled to the laser arrangement to control the laser arrangement to regulate an optical power of the laser line to complement a tilting frequency of a tiltable micro-electromechanical system (MEMS) mirror to tiltably reflect the laser line to project a light pattern on the object, wherein to regulate the optical power includes to increase the optical power of the laser line in response to increase of the tilting frequency of the MEMS mirror, and to decrease the optical power of the laser line in response to decrease of the tilting frequency of the MEMS mirror, according to correction values that include tilting frequency values of the MEMS mirror and corresponding optical power values of the laser line, wherein the optical power of the laser line is to increase during a first half of a mirror span and to decrease during a second half of the mirror span, wherein the controller is to apply combinations of tilting frequency values and corresponding optical power values to the laser arrangement and the MEMS mirror to maintain the optical power of the projected light pattern within a desired power range, wherein the tilting frequency values are selected within a frequency range for the MEMS mirror to project multiple scans of the laser line on the object during a sensing cycle of a capturing device, to capture an image of the object in response to the projection of the light pattern on the object by the apparatus, and wherein the corresponding optical power values are further selected to provide a desired signal-to-noise ratio (SNR) for the light pattern during the sensing cycle that comprises a receipt of readings of multiple scans of the light pattern.

19. The apparatus of claim 18, wherein the laser arrangement is controlled to regulate the optical power of the laser line based at least in part on acoustic noise requirements associated with the MEMS mirror.

20. An apparatus for projecting a light pattern on an object, comprising:
a tiltable micro-electromechanical system (MEMS) mirror to tiltably reflect a laser line to project the light pattern on the object; and
a controller coupled to the MEMS mirror and to control a laser arrangement to regulate an optical power of the laser line to complement a tilting frequency of the MEMS mirror, which includes to increase the optical power of the laser line in response to increase of the tilting frequency of the MEMS mirror, and to decrease the optical power of the laser line in response to decrease of the tilting frequency of the MEMS mirror, according to a correction table that includes tilting frequency values of the MEMS mirror and corresponding optical power values of the laser line, wherein the optical power of the laser line is to increase during a first half of a mirror span and to decrease during a second half of the mirror span, wherein the controller is to apply combinations of tilting frequency values and corresponding optical power values to the laser arrangement and the MEMS mirror to maintain the optical power of the projected light pattern within a desired power range, wherein the tilting frequency values are selected within a frequency range for the MEMS mirror to project multiple scans of the laser line on the object during a sensing cycle of a capturing device, to capture an image of the object in response to the projection of the light pattern on the object by the apparatus, and wherein the corresponding optical power values are further selected to provide a desired signal-to-noise ratio (SNR) for the light pattern during the sensing cycle that comprises a receipt of readings of the multiple scans of the light patterns.

21. The apparatus of claim 20, wherein the frequency range is from 4 kHz to 6 kHz or above 20 kHz.

* * * * *